United States Patent
Lin et al.

(10) Patent No.: US 8,959,237 B2
(45) Date of Patent: Feb. 17, 2015

(54) WEB SERVICES REQUESTS THROTTLING

(75) Inventors: Zhijian Lin, Dublin, CA (US); Wei Guang Tan, San Jose, CA (US); Lodema Steinbach, Clayton, CA (US)

(73) Assignee: Cellco Partnership, Basking Ridge, NJ (US)

( * ) Notice: Subject to any disclaimer, the term of this patent is extended or adjusted under 35 U.S.C. 154(b) by 288 days.

(21) Appl. No.: 12/875,625

(22) Filed: Sep. 3, 2010

(65) Prior Publication Data

US 2012/0060062 A1 Mar. 8, 2012

(51) Int. Cl.
*G06F 15/16* (2006.01)
*G06Q 10/00* (2012.01)
*H04L 29/08* (2006.01)

(52) U.S. Cl.
CPC ............ *G06Q 10/00* (2013.01); *H04L 67/1002* (2013.01)
USPC ........... 709/229; 709/225; 709/226; 709/232; 709/235

(58) Field of Classification Search
USPC .......................... 709/229, 232, 233, 234, 235
See application file for complete search history.

(56) References Cited

U.S. PATENT DOCUMENTS

| | | | | |
|---|---|---|---|---|
| 6,799,276 | B1 * | 9/2004 | Belissent | 726/14 |
| 8,281,382 | B1 * | 10/2012 | Sanyal et al. | 726/9 |
| 8,312,073 | B2 * | 11/2012 | Jakobsson | 709/201 |
| 2007/0118653 | A1 * | 5/2007 | Bindal | 709/226 |
| 2009/0106821 | A1 | 4/2009 | Kothari et al. | |
| 2009/0164632 | A1 * | 6/2009 | Kumar et al. | 709/225 |
| 2011/0153839 | A1 * | 6/2011 | Rajan et al. | 709/227 |

* cited by examiner

*Primary Examiner* — Liangche A Wang
*Assistant Examiner* — Cheikh Ndiaye (57) ABSTRACT

A method of web services throttling in a web application server environment, where a number of web services servers communicate with web services clients over a network. A request is received from a web services client which contains an account ID related to the web services client. An ID reader resident on one of the web services servers reads the account ID; and a value related to the account ID in a counter, resident on the one of the services servers, is incremented. The method also involves communicating with the remaining web services servers to increment the value in a plurality of counters, each of which is resident on one of the remaining web services servers. The web services servers compare the count value related to the account ID to a throttling limit value.

17 Claims, 7 Drawing Sheets

WEB SERVICES REQUESTS THROTTLING

TECHNICAL FIELD

The present subject matter relates to techniques and equipment to restrict number of requests from web services clients to prevent overloading a web services system with a high volume of requests that the system cannot process in time, due to the capacity of the web services system or backend systems that the services depend on.

BACKGROUND

In recent years, Web Services is a popular technology for companies to provide services APIs ("application programming interfaces") to integrators and developers to develop products using a company's services APIs over the Internet. This allows the company to open up opportunities for outside developers to innovate with and within the company's services. This provides benefits to both the customers and the company. For example, a wireless carrier can provide messaging web services for developers. The developers can then develop messages related products, which encourages more message usage among the subscribers. The customers benefit from a new product, and the company benefits from the increased usage and updated features it did not have to spend the time and resources to develop.

A web services client is typically a software program that makes API calls to the web services servers. Unlike the regular World Wide Web, where users interact with web servers via manual clicks in the web browsers, a web service client can submit multiple requests to web services servers simultaneously and continuously. Because the capacity of web services servers is limited, too many simultaneous requests from the client may overload the system. System overload causes the system to return slow responses to requests, or even stop functioning. This imposes a challenge to the web services servers: how to ensure quality of service to majority of the clients when a few clients are sending too many requests? One method is throttling.

Throttling is a mechanism used to limit the number of requests to the web service either by refusing or delaying requests in a specified time interval to provide better quality of service. A few examples of throttling policy include concurrent, idle, request and volume. Concurrent throttling policy imposes a limit on the number of concurrent requests at any one time. Idle throttling policy imposes a minimum idle time between requests. Request throttling policy imposes a limit on the number of requests per period. Volume throttling policy imposes a limit on the volume, such as kilobytes, sent per period. However, these mechanisms are typically implemented on a server by server basis within a single group of servers (or "farm"). Thus, each server in the farm can reach the throttling limit when inundated with many requests from the same client. This will affect the farm as a whole and slow the responses from all servers involved.

Hence a need exists for the web services servers to communicate with one another to learn about the total number of requests among all the servers in order to enforce the limit of requests for each client, to reduce or prevent all servers in a farm from being adversely impacted by a large amount of requests.

SUMMARY

The teachings herein alleviate one or more of the above noted problems with a new approach to throttling in a web application server environment. In the environment, a mobile station communicates with a plurality of web services servers over a network. The method includes the steps of receiving, from a web services client a request containing an account identifier (ID) related to the web services client. A step of reading, by an ID reader resident on one of the plurality of web services servers, the account ID, and incrementing a value in a counter, which is resident on the one of the plurality of web services servers. The value is related to the account ID. The method includes communicating with the remaining plurality of the web services servers to increment the value in counters resident on the remaining web services severs; and comparing, on the plurality of web services servers, the value to a throttling limit value.

Another example is that to process the request, on the one of the web services servers, if the count value related to the account ID is less than or equal to the throttling limit value. However, of a request is not immediately processed on the one of the web services servers, if the count value related to the account ID is greater than the throttling limit value, when the request is received. In this later example, processing may be denied, for example, by sending an error message to the web services client. Alternatively, the server receiving the request when the count value exceeds the throttling limit value may delay processing the request until the count value is less than or equal to the throttling limit value.

Other concepts relate to unique software for implementing the web services throttling in a web application server environment. Such software product, in the form of an article of manufacture, includes at least one machine readable storage medium, and programming instructions embodied in the at least one medium for execution by one or more computers. The programming configures one or more computers to be capable of performing web server throttling functions, and the programming includes an initial script which, each time it is periodically started, implements certain functions.

The functions include setting a throttling limit value in a plurality of counters resident on a plurality of web services servers, wherein the throttling limit is a number of requests per time period. Receiving, at one of the web services servers, a request from a web services client, wherein the request comprises an account ID related to the web services client. Then, incrementing a value in a counter resident on the one of the web services servers. The count value is related to the account ID. Then instructing a remainder of the web services servers to increment a plurality of counters, each resident on the remainder of the web services servers. Next, compare, on the web services servers, the count value to the throttling limit value. If the value is less than or equal to the throttling limit value, process the request on the one of the plurality of web services servers. If the value is greater than the throttling limit value, the request is not immediately processed by one of the plurality of web services servers. Further implementing the not immediately processing the request can include sending an error message to the web services client or delaying processing the request until the count value is less than or equal to the throttling limit value. Additional steps include, setting the count value to zero in the plurality of counters resident on the plurality of web services servers, once the time period is exceeded.

As a result, a throttling limit can be strictly enforced, since all of the servers in a farm will know the total amount of requests associated with a given account ID, so that each individual server is not overwhelmed by a large number of requests.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The exemplary solution allows the individual web services servers to have a unified throttling limit for requests from particular web services clients.

Figure 1:
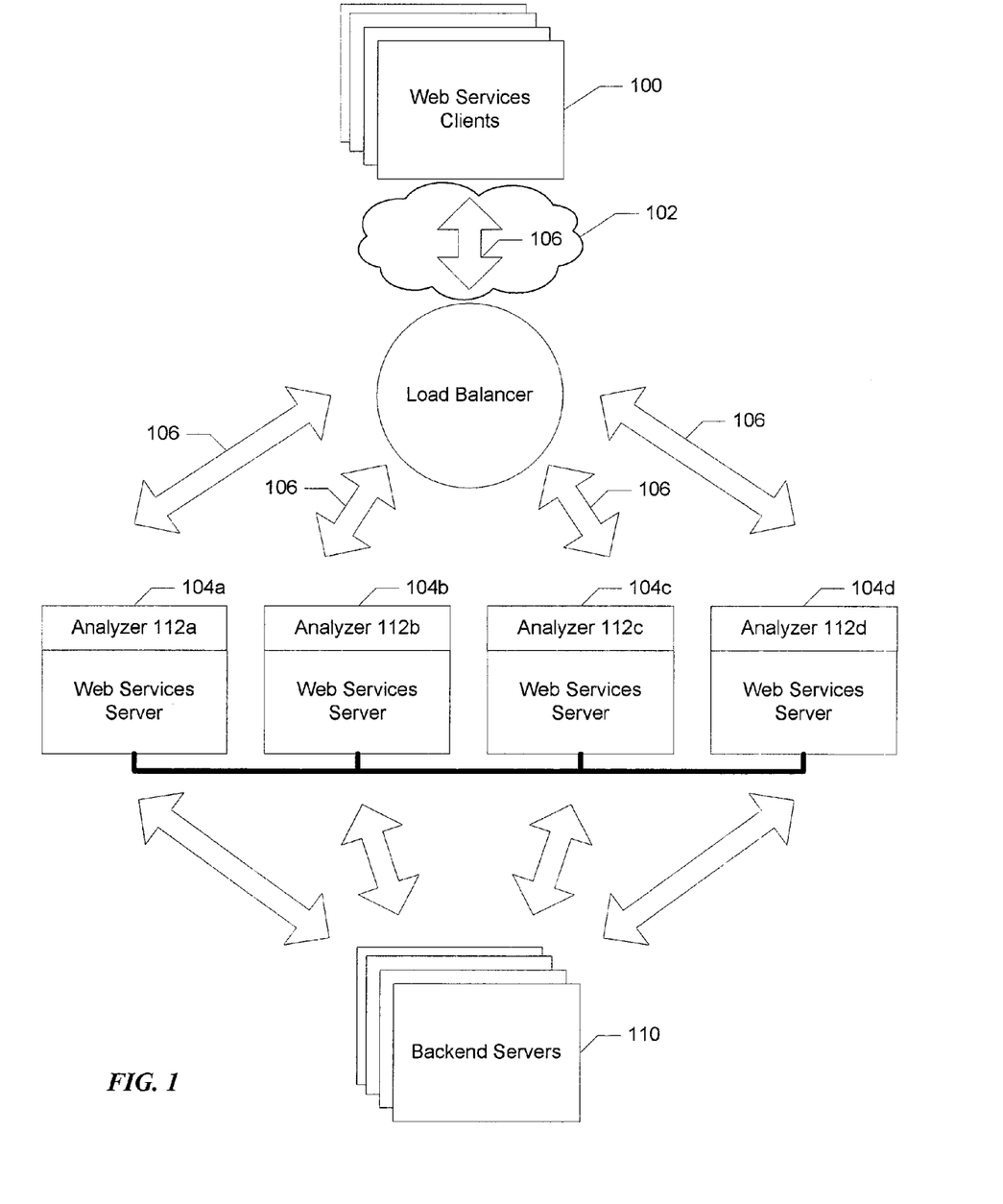
FIG. 1 is a high-level functional block diagram of the architecture of a distributed web services system that may implement an example of the load balancing discussed herein.

Reference now is made in detail to the examples illustrated in the accompanying drawings and discussed below. FIG. 1 illustrates the high-level functional block diagram of the architecture of a distributed web services system, which implements request throttling. A web services client 100 a software program that makes API calls to the web services servers. The web services client 100 can be running on any computer or mobile station. The web services client 100 communicates with two or more web services servers 104a, 104b . . . 104d over a network 102.

In one context, a web browser can be running on a mobile station and the web services client 100 is activated from inside the browser. The mobile station (not illustrated) is connected to a wireless network 102 to allow the web service client 100 to communicate with the web services servers 104a, 104b . . . 104d.

The web services client 100 sends one or more requests 106, over the network 104, to the web services servers 104. The requests 106 can be typically first handled by a load balancer 108, which forwards each request to the web services server 104 depending on a particular load balancing rule. Load balancing, for this invention, is a technique to distribute workload evenly across the two or more web services servers 104. Load balancing rules include simple "round robin" rules and complicated scheduling and analysis functions.

The load balancer 108 is used order to get optimal resource utilization, maximize throughput, minimize response time, and avoid overload. The load balancer 108 can be a dedicated program or hardware device (such as a multilayer switch or a DNS server). When the load balancer is a software program, it can listen on the port where web services client 100 connect to the web services server 104.

The load balancer 108 forwards the requests 106 to one of the web services servers 104. Once processed, the web services server 104 usually replies to the load balancer 108. This allows the load balancer 108 to reply to the web services client 100 without the web services client 100 ever knowing about the internal separation of functions. The load balancer 108 also prevents the web services client 100 from contacting web services servers 104 directly. This has security benefits.

Each web services server 104 has the same logic to process requests, including connecting to backend servers 110 to complete the services requests 106 and return responses to the web services client 100. Under a round robin balancing rule, the load balancer 108 distributes the requests 106 in an order across the web services servers 104, for example first to web services server 104a, then to web services server 104b, etc.

As an example, mobile wireless communications carriers, such as Verizon Wireless, have customer communication systems to provide notifications to their customers, for example as SMS messages to account holders' mobile stations, as emails, etc. Because of the large number of customers served by a major carrier, and the level of account activities, the volume of notification message traffic is quite large. To effectively provide such notifications, Verizon Wireless implemented a web server layer and an application layer.

The architecture allows web services client 100 to send a request 106, for example for a notification, to the web services servers 104. The web services server 104 then forwards the client request 106 to one of the number of backend (application) servers 110. Each application server 110 has multiple applications running on it. The application server 110 determines the proper application to process the client request 106 based on the data (context root) 116 (see FIG. 2) of the client request 106. The application server 110 processes the client request 106 and then a reply is sent back to the web services server 104 which will then forward the reply back to the web services clients 100.

Figure 2:
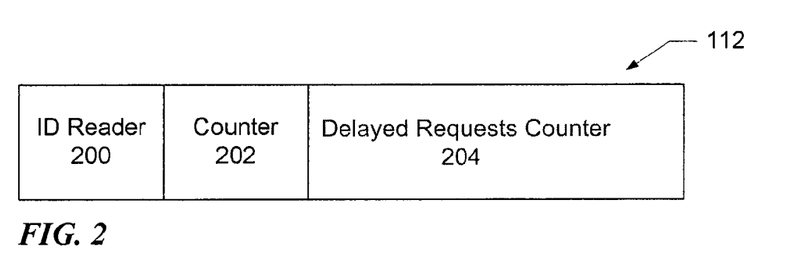
FIG. 2 is a high-level functional block diagram of the throttling analyzer that may be implemented at a web services server of the system of FIG. 1.
Figure 3:
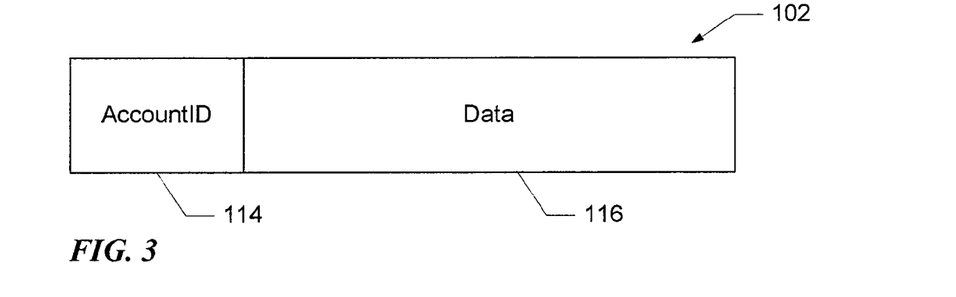
FIG. 3 is a high-level functional block diagram of a web services request.

FIG. 2 illustrates that each of the individual web services servers 104a . . . 104d is running a throttling analyzer 112a . . . 112d. In order to throttle requests from each web services client 100, the throttling analyzer 112 on each web services server 104 has an ID reader 200. that reads an identifier associated with each request 106. Each web services client 100 has an account ID 114, (e.g. accountID, see FIG. 3) which is part of request 106, along with the data 116 for the request itself.

The throttling analyzer 112 also has a counter 202 that counts and stores the number of requests 106 from each web services client 100, as identified by the account ID 114 over a specified period of time. In an example, the counter 202 counts and stores the number of requests 106 per web services client 100 for each second.

The throttling analyzer 112a, in addition to keeping track of the requests 106 made to its particular web services server 104a, can then instruct the web services server 104a to communicate with the remaining web services servers 104b . . . 104d. The communication informs the other throttling analyzers 112b . . . 112d to increment their count for that particular web services client 100 as well. By having each web services server 104 increase its counter with the requests 106 from other web services servers 104, ensures each web services server 104 has the up-to-date total number of requests for a particular web services client 100 among all the web services servers 104 to enforce the throttling limits.

The throttling limits can be set such that each web services client 100 has a limit of requests 106 per time period. For example, each web services client 100 can be limited to 5 requests per second. If the web services client 100 submits more than the limit of requests for a period of time (e.g. client submits a 6th request in the same second (sec. #1)), the web services server 104 can perform a number of tasks.

The throttling analyzer 112 can inform the web services server 104 that a particular web services client 100 exceed the preset limit. Then, in response to the 6th request 106, the web services server 104 can either reject the 6th request with an error response, or not return response of the 6th request until the next second (sec. #2).

At the end of each preset time period, the counter 202 is reset to zero (0) for every account ID 114. The process of counting and communicating to enforce the throttling limits is then repeated for this new cycle. Once the time period ends, the counter is reset, and the process begins again.

In an example, the throttling limits are set at 4 requests per second. Web services client 100 sends 5 requests in one second. The requests 106 reach the load balancer 108, which then distributes the requests "round robin" to web services servers 104a, 104b, 104c, 104d. In this example, web services server 104a receives the 1st request 106, web services server 104b receives the 2nd request 106, web services server 104c receives the 3rd request 106, web services server 104d receives the 4th request 106, and web services server 104a receives the 5th request 106.

The throttling analyzer 112a of the web services server 104a, using ID reader 200 reads the account ID 114 and identifies the web service client. The counter 202 stores "1" request and the communication is sent to the remaining throttling analyzers 112b . . . 112d to also increment their counters 202 by "+1." The throttling analyzer 112a then determines that the count is less than the throttling limit and instructs web services server 104a to process the request 106. The throttling analyzer 112b of the web services server 104a receives the communication and increments its counter by 1. The throttling analyzer 112b identifies the 2nd request, increments its counter by "1" and determines that the number of requests, now 2, is less than the throttling limit. The throttling analyzer 112b instructs web services server 104a to process the request 106 and communicate the "+1" message to the other throttling analyzers 112c, 112d, 112a. This process is repeated by throttling analyzers 112c and 112d, on web services servers 104c and 104d, respectively. These web services servers 104 process the 3rd and 4th requests 106, since they are still within the throttling limits.

Web services server 104a receives the 5th request 106 from web services client 100. Previous to receiving the 5th request 106, the throttling analyzer's 112a counter 202 has received three "+1" communications from web services servers 104b . . . 104d. Counter 202 is now set to "4," which in inclusive of its own count, plus the three other request processed on the other web services servers 104. The throttling analyzer 112a reads the account ID 114 and increments counter 202 to "5." The throttling analyzer 112a then determine that the 5th request exceeds the throttling limit and informs the web services server 104a to not process the 5th request, by either sending an error message or delaying servicing the request. Once the second ends, the counters are reset to zero and begin the process again.

In an example, web services servers 104 communicate with one another with a TCP socket to communicate each request it receives from a client. A format of the "+1" communication message can be "accountID=xxxx", which indicates it has just received a request from web services client 100 with an account ID of "xxxx."

Figure 4:
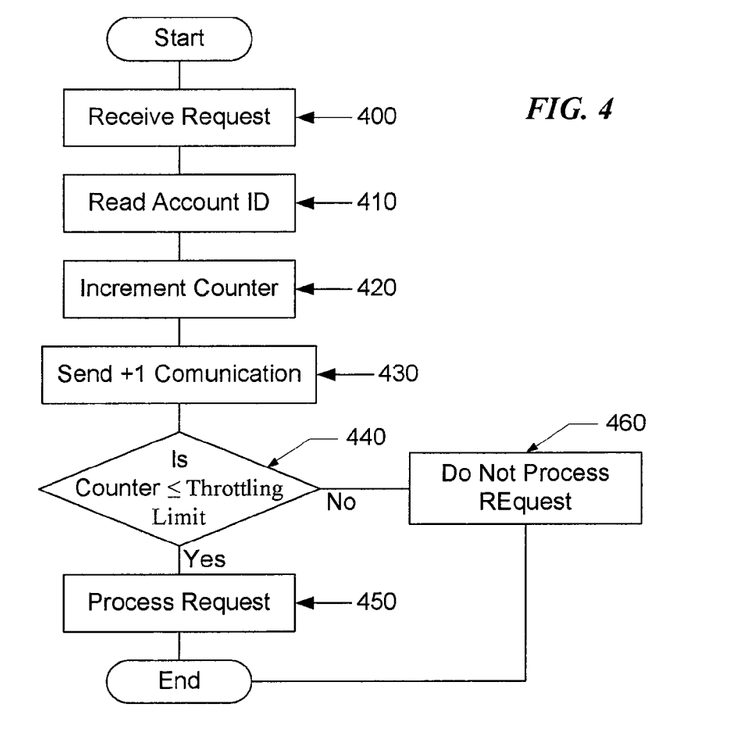
FIG. 4 is a flow chart of an example of a process for throttling of the web services requests.

An example of the particular steps of above method is illustrated in FIG. 4, wherein web services server 104 receives the request 106 (step 400). The throttling analyzer 112 then reads the account ID 114 for the particular web services client 100 who sent the request 106 (step 410). The counter 202 is then incremented by "+1" (step 420) and the "+1" communication to the remaining web services servers 104 is sent (step 430). The throttling analyzer 112 then compares the value of the counter 202 to the throttling limit, and if the counter is less than or equal to the throttling limit (step 440), the request 106 can be processed (step 450). If the counter exceeds the throttling limit, the request is not processed (step 460).

Figure 5:
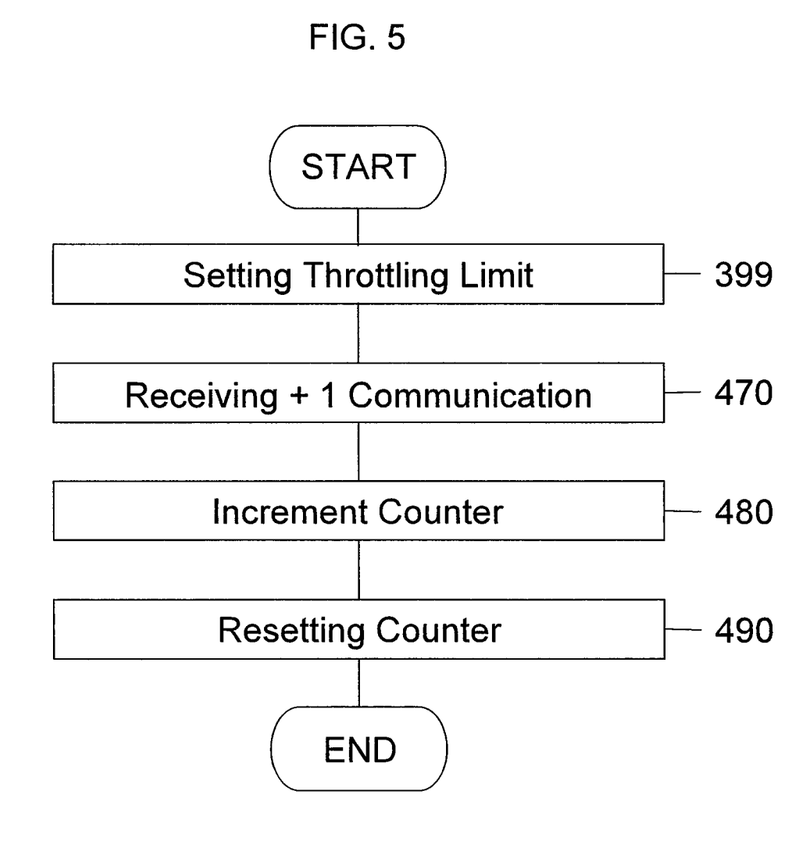
FIG. 5 is a flow chart of an example of a process for further methods of web services request throttling.
Figure 6:
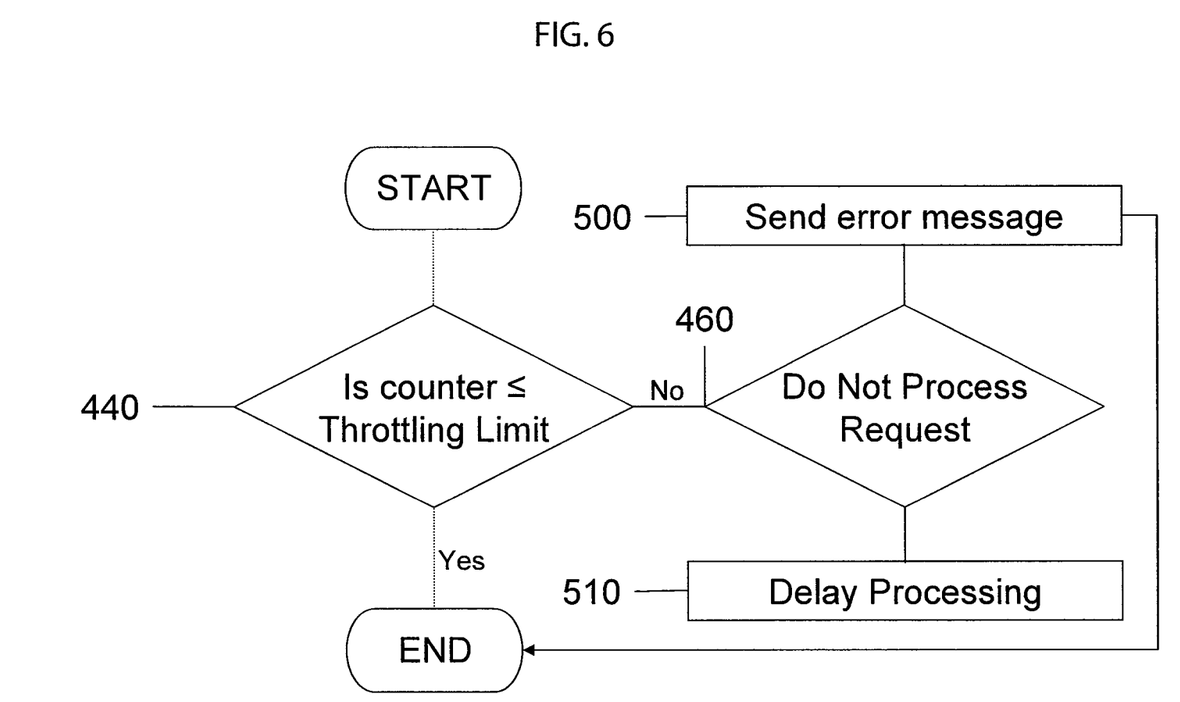
FIG. 6 is a flow chart of an example of a process for delaying the processing of a web services request.

Further steps in the method, as illustrated in FIG. 5, include receiving one or more "+1" communications (step 470) and incrementing the counter 202 by 1 for each communication (step 480). Other steps include resetting the counter to "0" (step 490) and setting the throttling limit (step 399). FIG. 6 illustrates further steps to not process the request (step 460) at least one of an error message is returned to the web services client 100 (step 500) or the processing of the request is delayed until next cycle (step 510). When a request is delayed to the next cycle, it becomes the first request in the queue. Thus, it the previously over-the-limit request, becomes the first request in the next cycle.

Figure 7:
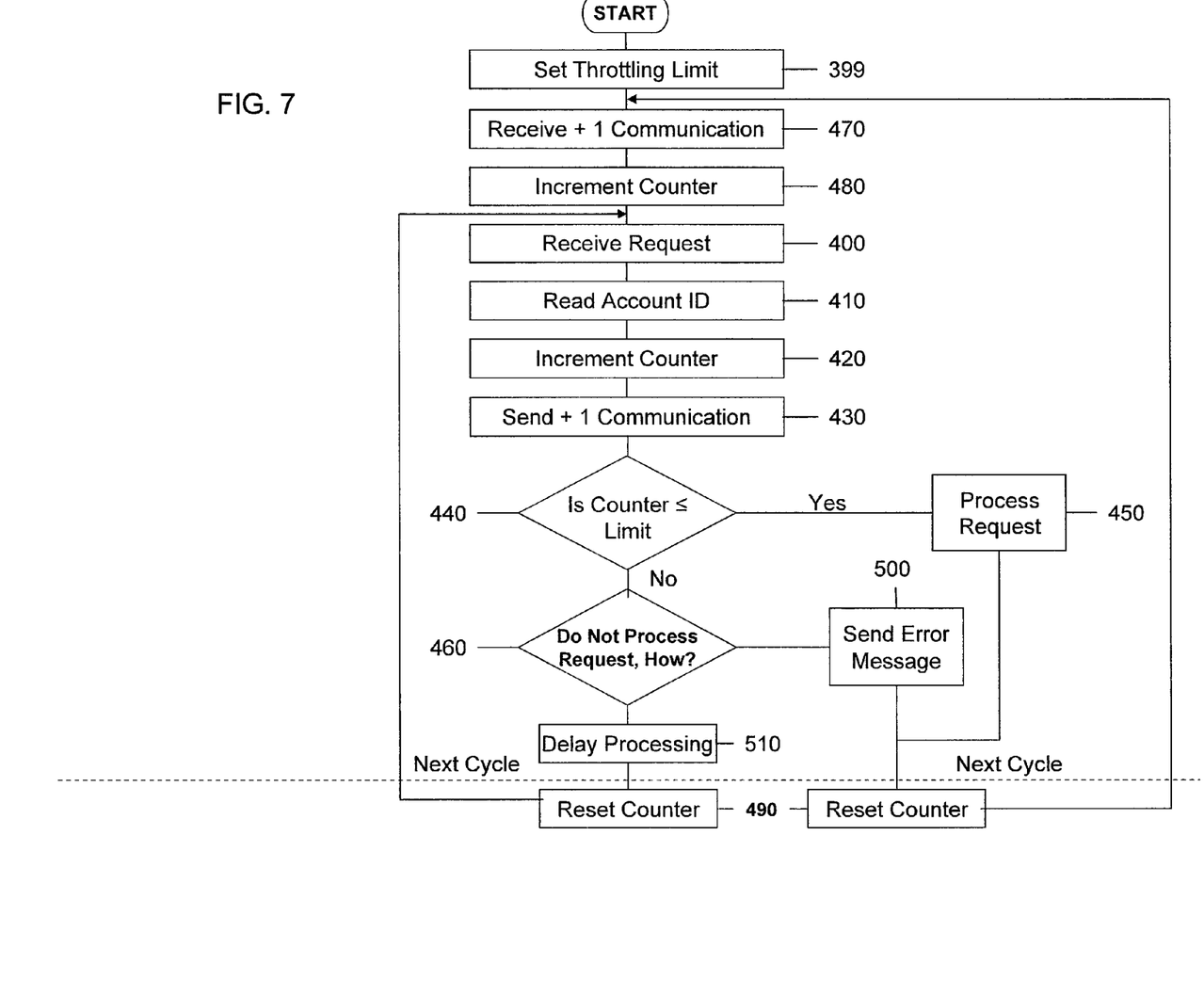
FIG. 7 is a flow chart of another example of a method of web services request throttling.

FIG. 7 illustrates one example of the present invention, using the steps outlined above and showing certain steps that take place after the first cycle has been completed.

Another example of how a request that is not processed can be handed is that the web services servers 104 have a delayed processing limit on number of requests that can be in the "delayed processing" state for each account ID 114. In one example, the delayed processing limit is particular to each web services server (e.g. 104a) and not shared or communicated through the farm of web services servers 104. Once the delayed processing limit is reached, the web services server 104 returns an error message for any additional requests 106. The analyzer 112 can count the delayed requests using a delayed requests counter 204 and compare them to the delayed processing limit.

Figure 8:
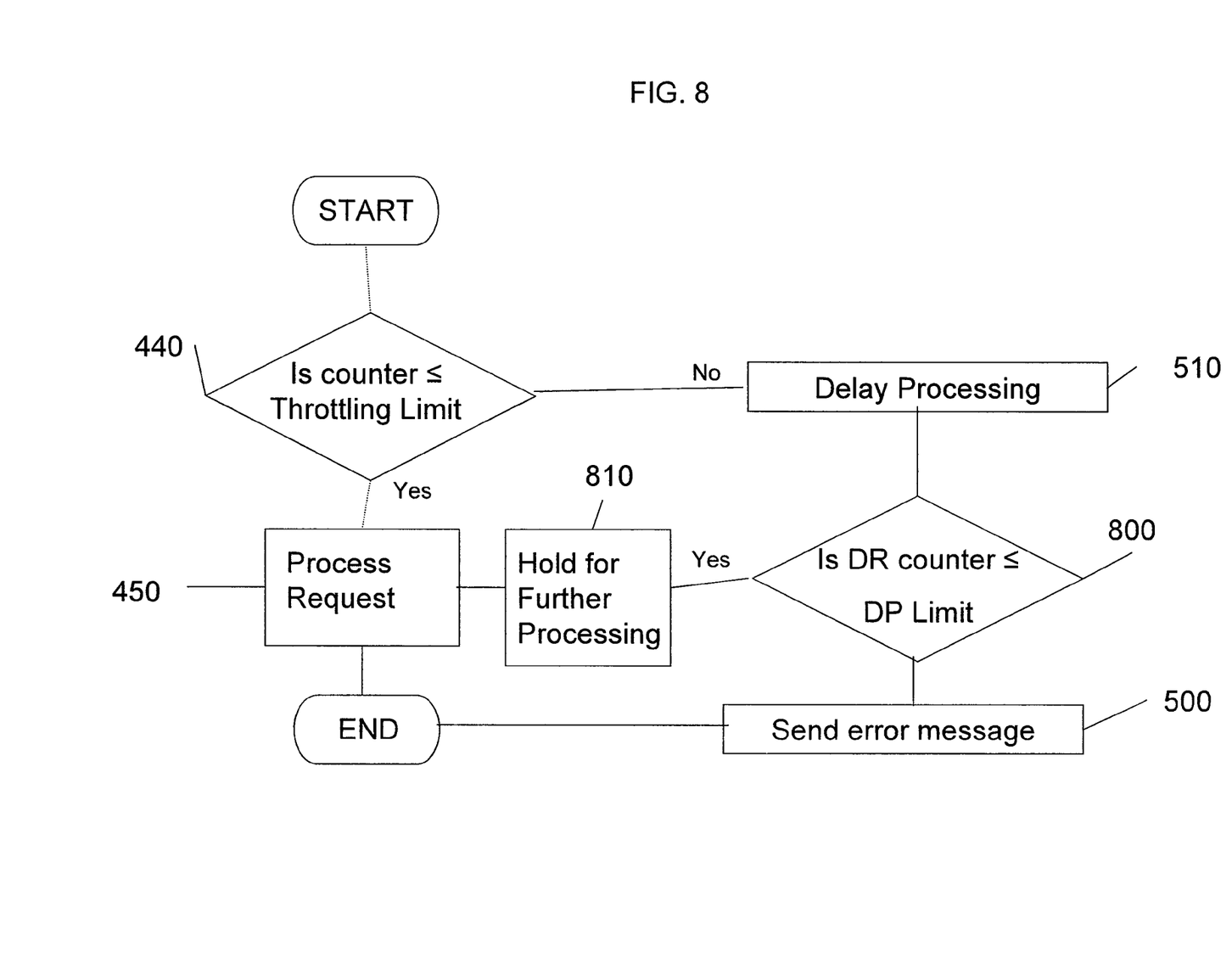
FIG. 8 is a flow chart of another example of a process for delaying the processing of a web services request.

FIG. 8 illustrates a method of delayed processing by the web services servers 104. As above for FIG. 6, the throttling analyzer 112 compares the value of the counter 202 to the throttling limit, and if the counter is less than or equal to the throttling limit (step 440), the request 106 can be processed (step 450). If the counter exceeds the throttling limit, the processing of the request is delayed (step 510). The throttling analyzer 112 then compares the value of the delayed requests counter 204 to the delayed processing limit, and if the "DR" counter is less than or equal to the "DP" limit (step 800), the request 106 is held for further processing (step 810). If the delayed requests counter 204 exceeds the delayed processing limit, an error message is returned (step 500).

Examples of this method are implemented in software that is running on the web services servers 104. In this example, the load balancer 108 does not have the capability of accessing the account ID 114 in the request 106. Thus, the load balancer cannot count the number of incoming requests from any particular web services client 100. This is the example regardless if the load balancer 108 is implemented in software or hardware.

Figures 9, 10:
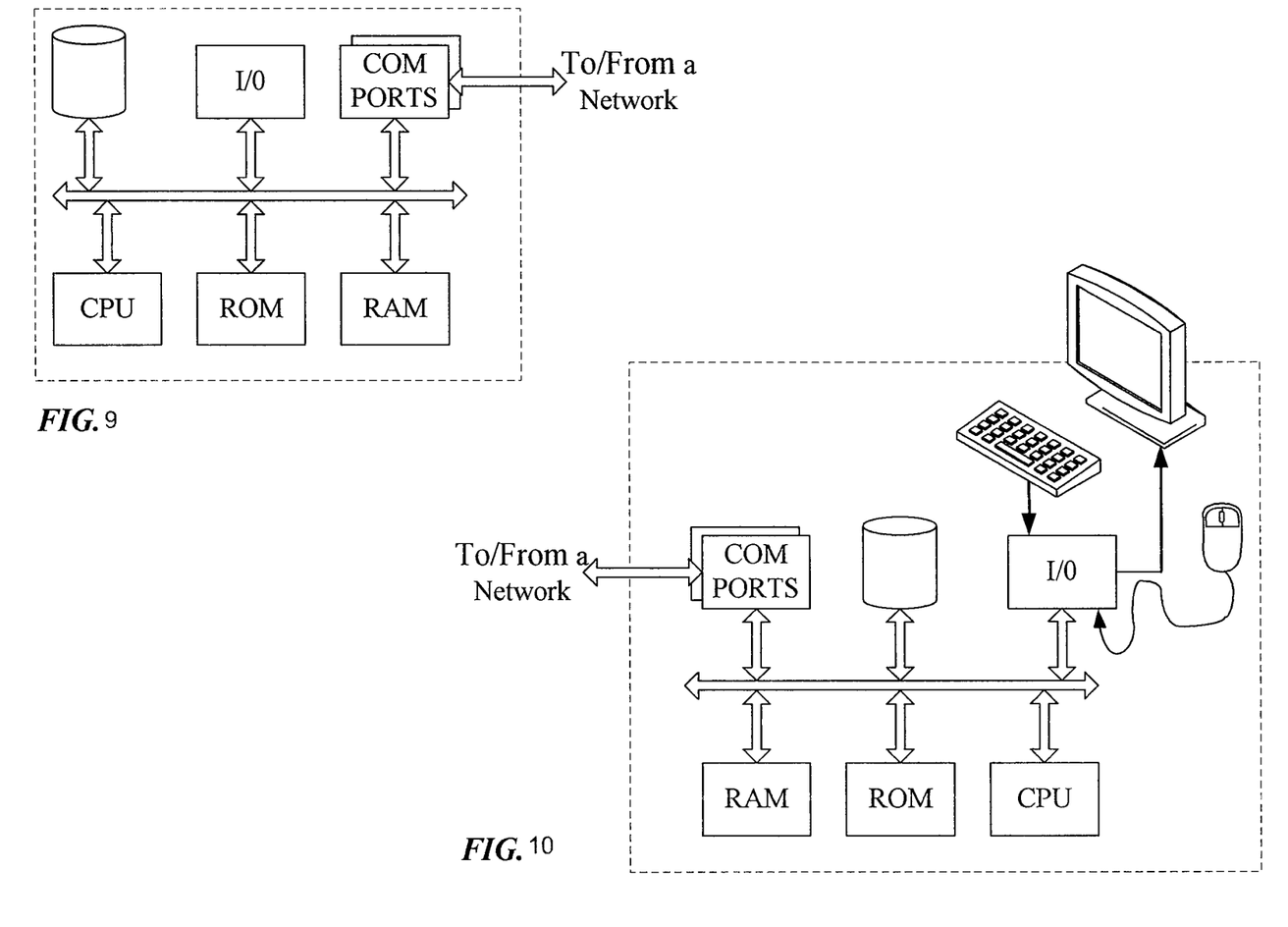
FIG. 9 illustrates a network or host computer platform, as may typically be used to implement a server.
FIG. 10 depicts a computer with user interface elements, as may be used to implement a personal computer or other type of work station or terminal device.

FIGS. 9 and 10 provide functional block diagram illustrations of general purpose computer hardware platforms. FIG. 9 illustrates a network or host computer platform, as may typically be used to implement a server. FIG. 10 depicts a computer with user interface elements, as may be used to implement a personal computer or other type of work station or terminal device, although the computer of FIG. 10 may also act as a server if appropriately programmed. It is believed that those skilled in the art are familiar with the structure, programming and general operation of such computer equipment and as a result the drawings should be self-explanatory.

A web services server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers and terminal device computers are conventional in nature, and it is presumed that those skilled in the art are adequately familiar therewith. Of course, the server functions may be implemented in a distributed fashion on a number of similar platforms, to distribute the processing load Hence, aspects of the methods to provide request throttling, as outlined above, may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the network operator into the computer platform of a web server and platforms of the associated application servers that will implement the monitoring, etc. of the thread count analyzer. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible, non-transitory "storage" media, terms such as computer or machine "readable medium" refer to any medium that participates in providing instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising steps of:
   receiving, from one of a plurality of web services clients in communication over a network with a plurality of web services servers grouped in a server farm of a web application server environment, a request containing an account ID identifying the one web services client;
   reading, by an ID reader resident on one of the plurality of web services servers, the account ID from the received request;
   incrementing, for a current period of time, a value in a counter associated with the account ID, the counter resident on the one web services server, the value being a non-zero integer;
   communicating from the one web services server with each remaining web services server of the plurality of web services servers to increment, on each respective one of the remaining web services servers, the value in the counter associated with the account ID and resident on the respective remaining web services server;
   comparing, for the current period of time, on each web services server of the plurality of web services servers, the value in the counter associated with the account ID to a throttling limit value set for the one web services client, wherein the throttling limit value is a number of requests per period of time;
   processing the received request, on the one of the plurality of web services servers, if the value in the counter is less than the throttling limit value;
   not immediately processing the received request, on the one of the plurality of web services servers, if the value in the counter is greater than the throttling limit value;
   and setting, for a subsequent period of time, the value in the counter resident in each web services server of the plurality of web services servers to a same predetermined value, once the current period of time is exceeded, such that the counter resident in each web services server is reset to the same predetermined value.

2. The method of claim 1, wherein the not immediately processing step comprises at least one of the steps of:
   sending an error message to the web services client; and
   delaying processing the received request until the value is less than or equal to the throttling limit value.

3. The method of claim 1, wherein the predetermined value is zero.

4. The method of claim 1, wherein the not immediately processing step comprises the steps of:
   delaying processing the received request until the value is less than or equal to the throttling limit value;
   counting a number of delayed requests related to the account ID, wherein a delayed requests counter is resident on a web services server;
   comparing the number of delayed requests to a delayed processing limit; and further comprising at least one of the steps of:
  sending an error message to the web services client; and
  holding the delayed request until the value is less than or equal to the throttling limit value.

5. The method of claim 4, wherein the delayed processing limit is specific to each web services server.

6. The method of claim 4, further comprising:
  sending an error message to the web services client if the number of delayed requests exceeds the delayed processing limit.

7. The method of claim 1, further comprising the step of:
  sending an error message to the web services client, if the value in the counter resident on the one web services server and associated with the account ID is greater than the throttling limit value.

8. The method of claim 1, further comprising:
  scheduling, for the subsequent period of time, processing of the request containing the account ID associated with the value in the counter above the throttling limit.

9. An article of manufacture, comprising:
  at least one non-transitory machine readable storage medium; and
  programming instructions embodied in said at least one medium for execution by one or more computers, wherein the programming configures said one or more computers to be capable of performing functions for web services throttling in a web application server environment communicating over a network to a mobile station, the functions comprising:
  receiving, from a web services client, a request containing an account ID identifying the web services client;
  reading, by an ID reader resident on one of a plurality of web services servers, the account ID from the received request;
  incrementing, for a current period of time, a value in a counter associated with the account ID, the counter resident on the one of the plurality of web services servers, the value being a non-zero integer;
  communicating from the one web services server with each remaining web services server of the plurality of web services servers to increment, on each respective one the remaining web services servers, the value in the counter associated with the account ID and resident on the respective remaining web services server;
  comparing, for the current period of time, on each web services server of the plurality of web services servers, the value in the counter associated with the account ID to a throttling limit value set for the web services client, wherein the throttling limit value is a number of requests per period of time;
  processing the received request, on the one of the plurality of web services servers, if the value in the counter is less than the throttling limit value;
  not immediately processing the received request, on the one of the plurality of web services servers, if the value in the counter is greater than the throttling limit value; and
  setting, for a subsequent period of time, the value in the counter resident in each web services server of the plurality of web services servers to a same predetermined value, once the current period of time is exceeded, such that the counter resident in each web services server is reset to the same predetermined value.

10. The article of claim 9, wherein the not immediately processing the received request programming function comprises at least one function of:
  sending an error message to the web services client; and
  delaying processing the received request until the value is less than or equal to the throttling limit value.

11. The article of claim 9, wherein the not immediately processing the received request programming function comprises at least one function of:
  delaying processing the received request until the value is less than or equal to the throttling limit value;
  counting a number of delayed requests related to the account ID, a delayed requests counter is resident on a web services server;
  comparing the number of delayed requests to a delayed processing limit; and further comprising at least one of the functions of:
    sending an error message to the web services client; and
    holding the delayed request until the value is less than or equal to the throttling limit value.

12. The article of manufacture of claim 11, wherein the delayed processing limit is specific to each web services server.

13. The article of manufacture of claim 11, wherein the programming comprises functioning of:
  sending an error message to the web services client if the number of delayed requests exceeds the delayed processing limit.

14. The article of claim 9 wherein the predetermined value is zero.

15. The article of manufacture of claim 9, wherein the programming comprises functioning of:
  sending an error message to the web services client, if the value in the counter resident on the one web services server and associated with the account ID is greater than the throttling limit value.

16. An article of manufacture, comprising:
  at least one non-transitory machine readable storage medium; and
  programming instructions embodied in said at least one medium for execution by one or more computers, wherein the programming configures said one or more computers to be capable of performing web server throttling functions, and the programming comprises:
  one or more scripts which, each time they are periodically started, implement the following functions:
    setting a throttling limit value in a plurality of counters resident on a plurality of web services servers grouped in a server farm, wherein the throttling limit is a number of requests per time period;
    receiving, at one of the plurality of web services servers over a network, a request from the web services client, wherein the request comprises an account ID identifying the web services client;
    incrementing, for a current period of time, a value in a counter associated with the account ID, the counter resident on the one of the plurality of web services servers, the value being a non-zero integer;
    instructing, by the one web services server, each remaining web services server of the plurality of web services servers to increment, on each respective one of the remaining web services servers, the value in the counter associated with the account ID and resident on the respective remaining web services server;
    comparing, for the current period of time, on each web services server of the plurality of web services servers, the value in the counter associated with the account ID to the throttling limit value set for the web services client;

processing the received request, on the one of the plurality of web services servers, if the value in the counter is less than the throttling limit value;

not immediately processing the received request, on the one of the plurality of web services servers, if the value in the counter is greater than the throttling limit value; and setting, for a subsequent period of time, the value in the counter resident in each web services server of the plurality of web services servers to a same predetermined value, once the current period of time is exceeded, such that the counter resident in each web services server is reset to the same predetermined value.

17. The article of manufacture of claim 16, wherein the predetermined value is zero and the not immediately processing the received request function implements at least one of: ; and , and further implementing at least one of:

sending an error message to the web services client; and delaying processing the request until the value is less than or equal to the throttling limit value; and.

* * * * *